US011971974B2

(12) United States Patent
Suraparaju

(10) Patent No.: US 11,971,974 B2
(45) Date of Patent: Apr. 30, 2024

(54) METHOD AND SYSTEM FOR MAPPING A VIRTUAL SMART CARD TO A PLURALITY OF USERS

(71) Applicant: Konica Minolta Business Solutions U.S.A., Inc., Ramsey, NJ (US)

(72) Inventor: Rahul Suraparaju, Fremont, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 210 days.

(21) Appl. No.: 17/548,459

(22) Filed: Dec. 10, 2021

(65) Prior Publication Data
US 2023/0185891 A1 Jun. 15, 2023

(51) Int. Cl.
*G06F 21/33* (2013.01)
(52) U.S. Cl.
CPC .................................. *G06F 21/335* (2013.01)
(58) Field of Classification Search
CPC .............................. G06F 21/335; G06F 21/34
USPC .......................................................... 726/7
See application file for complete search history.

(56) References Cited

U.S. PATENT DOCUMENTS

| 2007/0204153 A1* | 8/2007 | Tome ................ H04L 63/0823 713/164 |
| 2016/0094546 A1* | 3/2016 | Innes ..................... G06F 21/33 713/156 |
| 2016/0191499 A1* | 6/2016 | Momchilov ............ G06F 21/78 713/171 |

* cited by examiner

Primary Examiner — Jacob Lipman
(74) Attorney, Agent, or Firm — BUCHANAN INGERSOLL & ROONEY PC

(57) ABSTRACT

A method, a non-transitory computer readable medium, and a personal computer for mapping a virtual smart card to a plurality of users. The method includes hosting, on a personal computer, an identity and access management (IAM) client, the IAM client configured to store a master virtual smart card for the plurality of users on the personal computer; authenticating, on the personal computer, a first user of the plurality of users; injecting, by the IAM client on the personal computer, an identity of the first user of the plurality of users and a personal identification number of the virtual smart card into a Kerberos communication application programming interface (API) with an Active Directory (AD), the Active Directory (AD) including the plurality of users; and mapping, on the personal computer, the master virtual smart card to the first user of the plurality of users.

20 Claims, 5 Drawing Sheets

METHOD AND SYSTEM FOR MAPPING A VIRTUAL SMART CARD TO A PLURALITY OF USERS

FIELD OF THE DISCLOSURE

The present disclosure generally relates to methods and systems for solving operating system limitations on virtual smart card user scaling, and more particularly, methods and systems for mapping a virtual smart card to a plurality of users, for example, virtual smart cards associated with Microsoft Windows 10.

BACKGROUND

Microsoft Windows 10 has a feature called Virtual Smart Card, which equates to function as a physical public key infrastructure (PKI) smart card. The Virtual Smart Card of Microsoft Windows 10 functions through virtual means entirely within the operating system of itself, and ca use, for example, a trusted platform module (TPM) hardware chip, for example, a TPM 1.2 hardware chip that acts as a secure container. However, due to performance issues, the operating system (OS) has a hard cap on the number of virtual smart cards (VSCs). For example, the number of virtual smart cards is currently capped at ten (10) virtual smart cards in a personal computer (PC).

SUMMARY

In consideration of the above issues, a method and system is disclosed, which can achieve a virtual smart card being mapped to a plurality of user by securely and seamlessly injecting usernames into Kerberos communications with an Active Directory (AD).

In accordance with an aspect, a method for mapping a virtual smart card to a plurality of users, the method comprising: hosting, on a personal computer, an identity and access management (IAM) client, the IAM client configured to store a master virtual smart card for the plurality of users on the personal computer; authenticating, on the personal computer, a first user of the plurality of users; injecting, by the IAM client on the personal computer, an identity of the first user of the plurality of users and a personal identification number of the virtual smart card into a Kerberos communication application programming interface (API) with an Active Directory (AD), the Active Directory (AD) including the plurality of users; and mapping, on the personal computer, the master virtual smart card to the first user of the plurality of users.

In accordance with another aspect, a non-transitory computer readable medium storing computer readable program code executed by a processor for mapping a virtual smart card to a plurality of users, the process comprising: hosting, on a personal computer, an identity and access management (IAM) client, the IAM client configured to store a master virtual smart card for the plurality of users on the personal computer; authenticating, on the personal computer, a first user of the plurality of users; injecting, by the IAM client on the personal computer, an identity of the first user of the plurality of users and a personal identification number of the virtual smart card into a Kerberos communication application programming interface (API) with an Active Directory (AD), the Active Directory (AD) including the plurality of users; and mapping, on the personal computer, the master virtual smart card to the first user of the plurality of users.

In accordance with another aspect, a personal computer, comprising: a memory having an Active Directory; and a processor configured to: host an identity and access management (IAM) client, the IAM client configured to store a master virtual smart card for a plurality of users on the personal computer; authenticate a first user of the plurality of users; inject by the IAM client an identity of the first user of the plurality of users and a personal identification number of the virtual smart card into a Kerberos communication application programming interface (API) with the Active Directory (AD), the Active Directory (AD) including the plurality of users; and map the master virtual smart card to the first user of the plurality of users.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
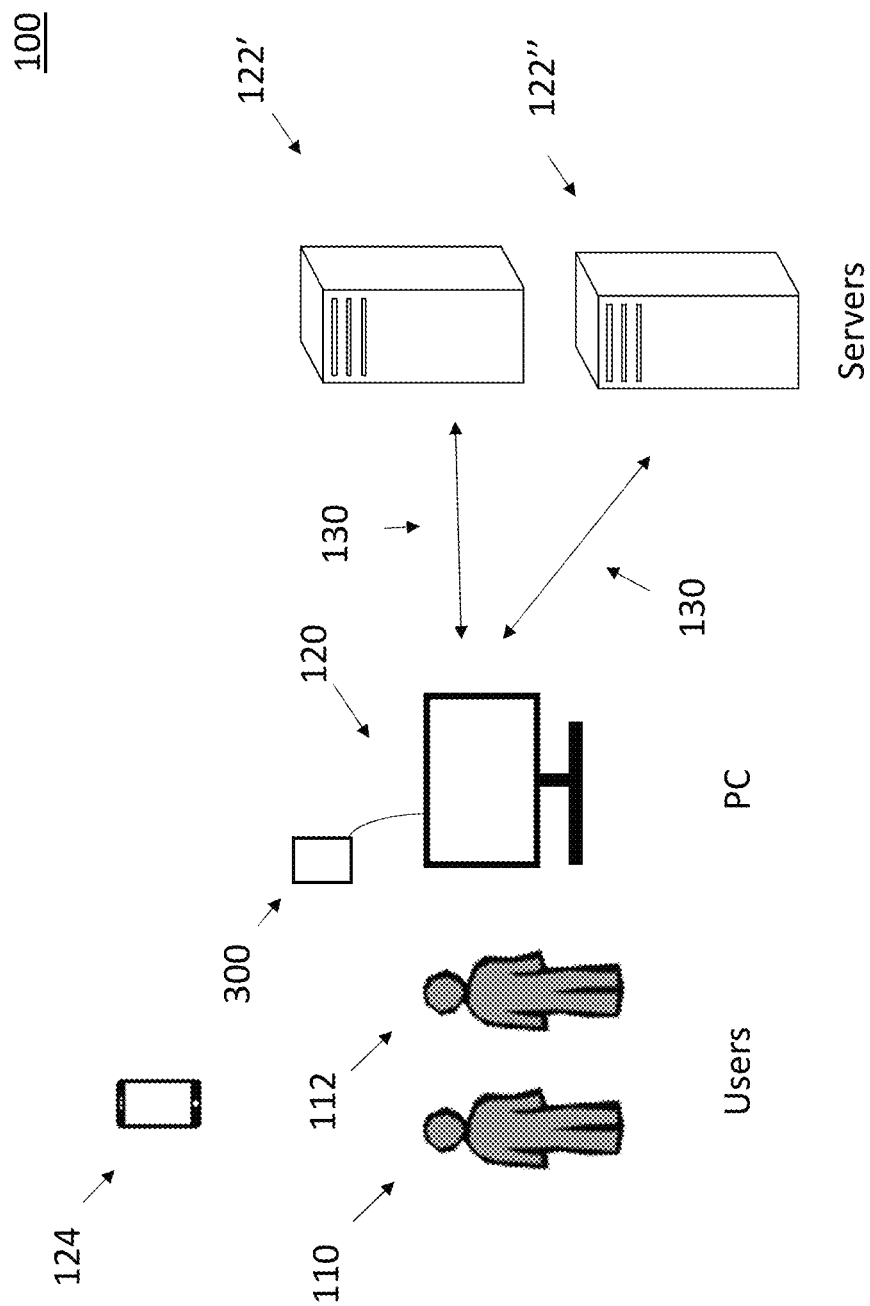
FIG. 1 is an illustration of a system for solving operating system limitations on virtual smart cards in accordance with an embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for solving operating system limitations on virtual smart cards in accordance with an embodiment. As shown in FIG. 1, the system 100 can include a plurality of users 110, 112, a personal computer 120, one or more servers 122', 122", an optional client device 124, and an optional, authentication device 300. In accordance with an exemplary embodiment, one or more of the plurality of users 110, 112 can be authenticated via the authentication device 300, which can be, for example, an external biometric device before accessing the personal computer 120. The one or more servers 122', 122" can include an identity and access management (IAM) server 120' as disclosed herein, and a server 122" configured as a database server, a file server, a mail server, a print server, a web server, a game server, and/or an application server, which can be accessed by a personal computer 120. For example, the server 122" can be used in a medical setting, for example, a hospital, a medical setting, and/or any other setting in which access, which can be access via a virtual smart card as disclosed herein. The system 100 can also include the client device 124, for example, a mobile client configured to receive an input code, for example, a series of numbers upon authentication of the user 110 with the authentication device 300.

The personal computer 120, the one or more servers 122', 122", and the optional client device 124 can be configured to communicate with one another via a communication network or network 130. The communication network or network 130 can be a public telecommunication line and/or a network (for example, LAN or WAN). Examples of the communication network 130 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission. In accordance with an exemplary embodiment, for example, the personal computer 120 and the authentication device 300 can be connected with a wire or wireless.

Figure 2:
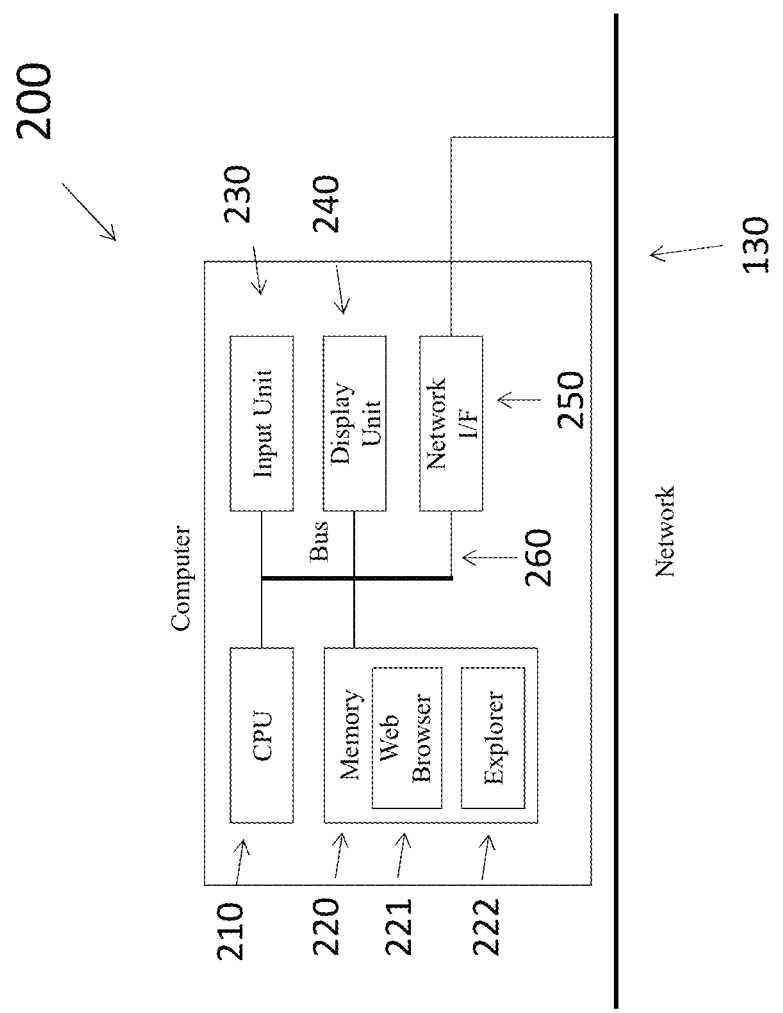
FIG. 2 is an illustration of a computer in accordance with an embodiment.

FIG. 2 is an illustration of a computer 200, which can be, for example, a personal computer (PC) 120, one or more of the servers 122', 122", or a client device 124, for example, a smart phone, in accordance with an exemplary embodiment. As shown in FIG. 2, the computer 200 can include a processor or central processing unit (CPU) 210, and one or more memories 220 for storing software programs and data. The processor or CPU 220 is configured to carry out the instructions of a computer program, which operates and/or controls at least a portion of the functionality of the computer device 200. The computer 200 can also include an input unit 230, a display unit or graphical user interface (GUI) 240, and a network interface (I/F) 250, which is connected to a communication network (or network) 130. A bus 260 can connect the various components 210, 220, 230, 240, and 250 within the client 200, 202, 204. The computer 200 also includes an operating system (OS), which manages the computer hardware and provides common services for efficient execution of various software programs as disclosed herein.

Figure 3:
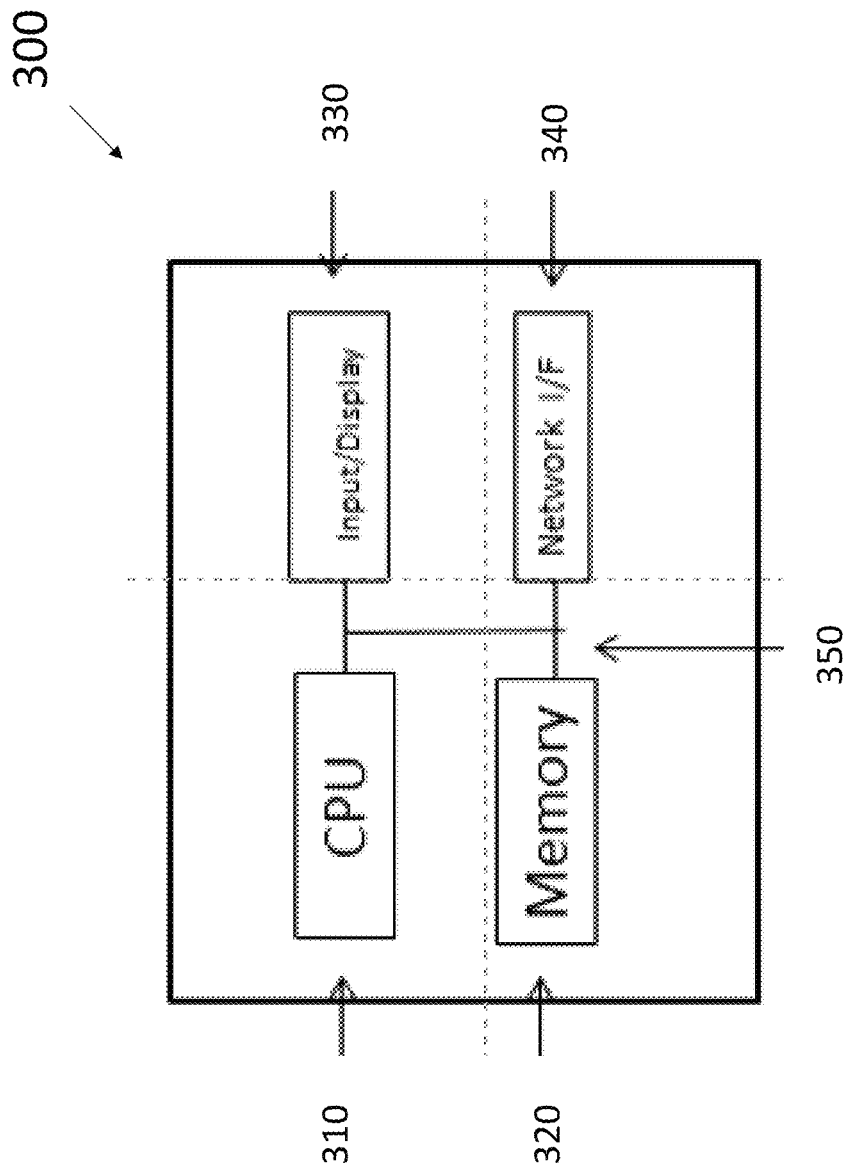
FIG. 3 is an illustration of an external biometric device in accordance with an embodiment.

FIG. 3 is an illustration of an exemplary biometric device 300 in accordance with an exemplary embodiment. In accordance with an exemplary embodiment, the exemplary biometric device 300 is a security identification and authentication device, which uses automated methods of verifying or recognizing the identity of a living person based on a physiological or behavioral characteristic. Thus, the user need not to manually input passwords to the multifunction printer. The method of recognizing the user can include, for example, fingerprints, electrocardiogram (ECG or EKG) information, facial images, iris, and voice recognition. For example, in accordance with an exemplary embodiment, the biometric device 300 can be an external biometric device 300 that includes an interface, for example, an input/display 330 configured to detect a fingerprint of a user 110. Alternatively, the biometric device 300 can be wearable device, for example, a Nymi™ band, which detection of the user is based on the electrocardiogram (ECG) and its unique properties, i.e., electrical activity of the heartbeat of the wearer.

As shown in FIG. 3, the biometric device 300 can include a processor or central processing unit (CPU) 310, and one or more memories 320 for storing software programs and data, for example, an operating system. In accordance with an exemplary embodiment, the processor or CPU 310 carries out the instructions of a computer program, which operates and/or controls at least a portion of the functionality of the biometric device 300. The biometric device 300 can also include the input unit and/or display unit or graphical user interface (GUI) 330, and a network interface (I/F) 340, which is configured to connect the biometric device 400 to the MFP 300 via, for example, a wire or wireless technology, for example, Bluetooth. A bus 350 can connect the various components 310, 320, 330, 340, within the biometric device 300.

Figure 4:
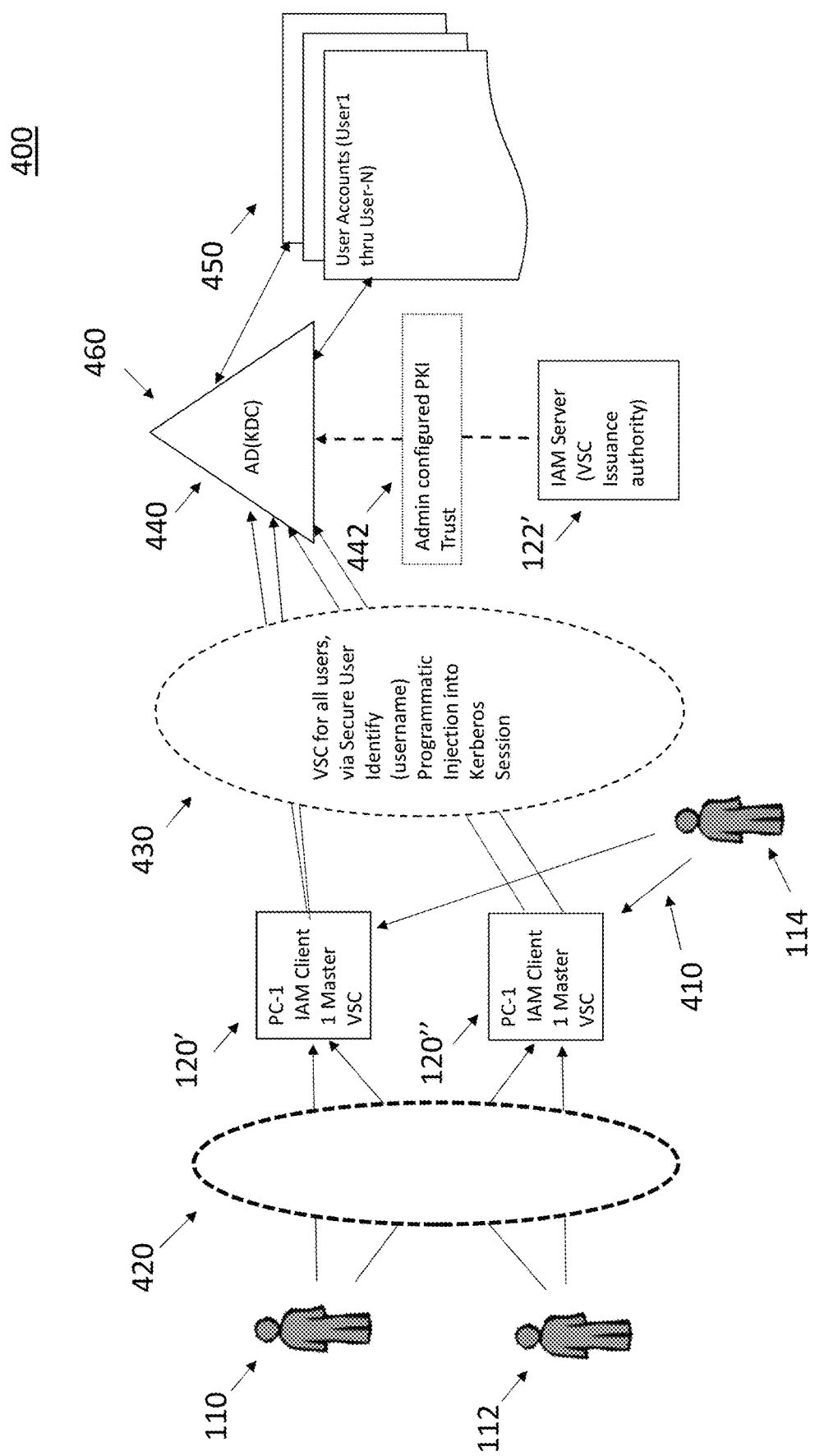
FIG. 4 is an illustration of a system that can achieve a virtual smart card being mapped to a plurality of user by securely and seamlessly inject usernames into Kerberos communications with an active directory (AD) in accordance with an embodiment.

FIG. 4 is an illustration of a system 400 that can achieve a virtual smart card being mapped to a plurality of user by securely and seamlessly injecting usernames into Kerberos communications with an Active Directory (AD) in accordance with one embodiment. As shown in FIG. 4, the system 400 includes a plurality of users 110, 112, a plurality of personal computers 120', 120", and an identify and access management (IAM) server 122". In accordance with an embodiment, the plurality of users 110, 112, can be authenticated on one of the plurality of personal computers 120', 120" via biometrics or an integrated circuit card (IC-card) authenticator with an IAM solution.

In accordance with an embodiment, the system 400 provides that one (1) virtual smart card can be consumed for all IAM solutions on each of the plurality of personal computers 120', 120". For example, an administrator 114, can perform a one-time provisioning of a software component, for example, called virtual smart card (VSC) life cycle manager to each of the plurality of personal computers 120', 120". The VSC life cycle manager can store a virtual smart card-personal identification number (VSC-PIN) into a Windows password vault. The administrator's PIN (i.e., that he/she enters PIN during enrolment) is to converted into another personal identification number (PIN), for example, NewPIN=Hash512 (Admin entered PIN+Some IAM defined Secret Random yet Static Number). In accordance with an embodiment, the system and method as disclosed provides that that even though the administrator 114 was the one enrolled the virtual smart card (VSC) on the personal computer 120', 120', the administrator 114 can not avail domain logon either on the behalf of the administrator 114 or on behalf of other users 110, 112. In accordance with an embodiment, PIN management can be cached and the retrieval of the PIN can be completely handled and managed by an IAM client on the personal computer 120', 120". In addition, the IAM client can be configured to store a PIN for the virtual smart card, and the PIN for the virtual smart card can be retrieved during Kerberos logon. In accordance with an embodiment, Kerberos uses the PIN to unlock the private key contained in the trusted platform module, for example, TPM 1.2.

In accordance with an embodiment, the system includes a master VSC certificate that is configured such that a user User Principle Name (userUPN) attribute is not used. In addition, the IAM server 122' service does not add the userUPN to the certificate when the IAM server 122 signs the certificate signing request (CSR) during issuance. For example, a Windows Custom Credential provider can fetch the cached VSC-PIN from the Windows Vault and can retrieve the PIN for the master VSC. Thus, the method is relatively seamless and can provide a secure user identity (username only) injection into a Kerberos session, for example, for use with Windows 10.

In accordance with an embodiment, the system 400 can allow a single (1) virtual smart card (VSC) to be used by a plurality of Active Directory (AD) user mapping in which the system 400 instructs the Kerberos protocol, which of the users in which the IAM client wants to apply the virtual smart card against. Specifically, this can be achieved by using a secure user identification process of the IAM client. In addition, the credential provider, for example, in Windows 10 can be assured about user's identity assertion. Thus, the credential provider injects the username into the Kerberos session, and wherein the user can be biometrically (or via IC card) pre-identified before authentication and domain join. The user identity of the user is retrieved and learned by the IAM client in the personal computer 120', 120", and that user identity, for example, username is programmatically injected into Kerberos communication application programming interfaces (APIs), while sharing the same VSC private key and public keys across several users. Thus, a mapping of a single (1) VSC to multiple Active Directory (AD) accounts can be achieved without any user intervention and wherein the IAM client has knowledge on which user is currently active in domain login. In addition, the mapping of the single virtual smart card (VSC) can be performed via a secure method, for example, the user can be biometrically identified.

As shown in FIG. 4, in step 410, the administrator 114 can execute a one-time virtual smart card provisioning to each of the one or more personal computers 120', 120". The one-time virtual smart card provisioning can include provisioning a single (1) master virtual smart card to each of the one or more personal computers 120', 120". In step 420, each of the plurality of users 110, 112, is authenticated by a biometric application or via a smart card or integrated circuit (IC) card. In step 430, the virtual smart card for each of the plurality of users via a secure user identity (e.g., username) is programmatically injected into the Kerberos session. In accordance with an embodiment, in step 440, the key distribution center (KDC) with UserUPN is disabled, such that the key distribution center (KDC) uses the username injected into the Kerberos session by the identity and access management (IAM) client that is being sent to the Active Directory (AD) 460. In addition, in step 442, the identify and access management (IAM)) server 122' provides virtual smart card issuance authority by providing an administrator configured public key infrastructure (PKI) or PKI trust to the Active Directory (AD) 460. In addition, as shown in step 450, each of the accounts of the plurality of users, for example, user accounts (User1 thru User-N) can be configured with alternative security identities (e.g. "altSecurityIdentities").

Figure 5:
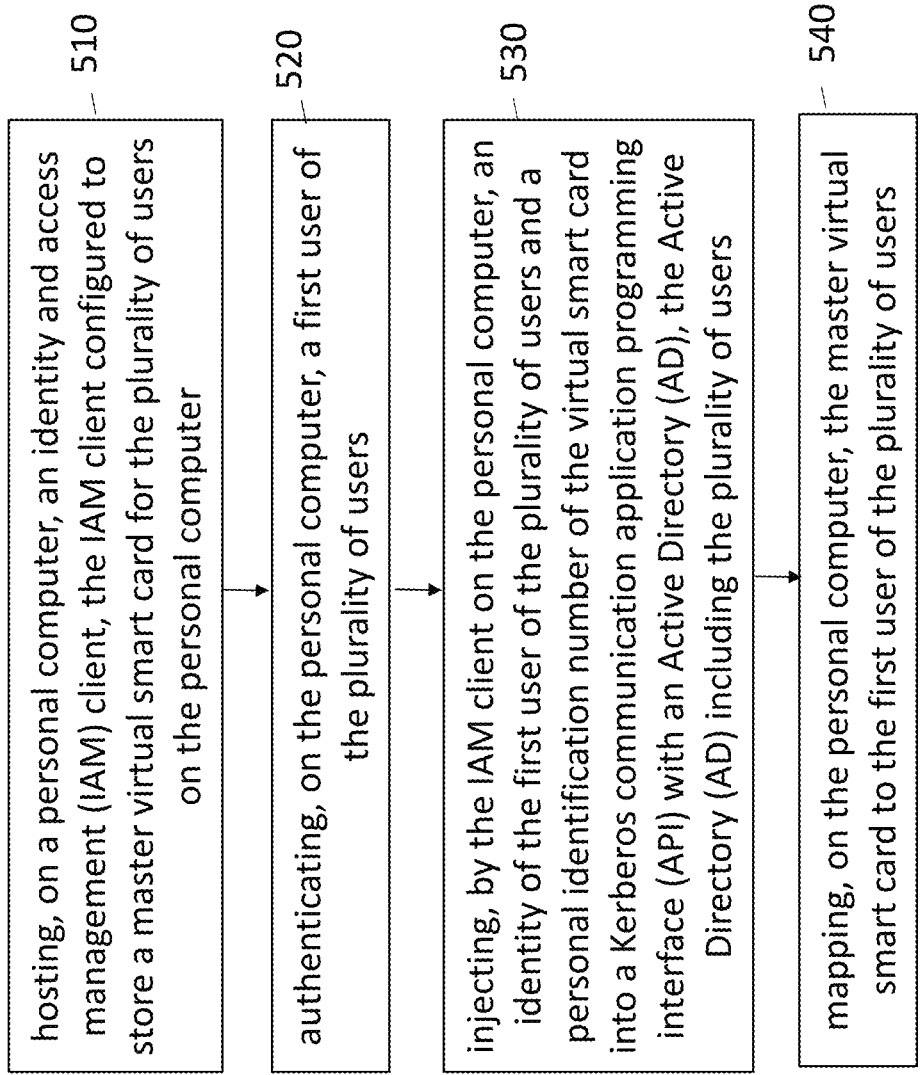
FIG. 5 is a flowchart illustrating a method for mapping a virtual smart card to a plurality of users in accordance with an embodiment.

FIG. 5 is a flowchart illustrating a method 500 for mapping a virtual smart card to a plurality of users in accordance with an embodiment. As shown in FIG. 5, in step 510, the method includes hosting, on a personal computer, an identity and access management (IAM) client. The IAM client being configured to store a master virtual smart card for the plurality of users on the personal computer. In a step 520, a first user of the plurality of users is authenticated on the personal computer. In a step 530, an identity of the first user of the plurality of users and a personal identification number of the virtual smart card are injected by the IAM client on the personal computer into a Kerberos communication application programming interface (API) with an Active Directory (AD). The Active Directory (AD) includes the plurality of users. In step 540, the master virtual smart card is mapped on the personal computer to the first user of the plurality of users.

In accordance with an embodiment, the Active Directory (AD) is an Active Directory (AD) Domain Services database. In addition, the method can further include receiving on the Active Directory Domain Services database, from an identify and access management server, an administrator configured public key infrastructure (PKI) trust for the master virtual smart card for use by the first user of the plurality of users. The personal computer can be a plurality of personal computers, and the method further includes provisioning, to each of the plurality of personal computers, the master virtual smart card. In accordance with an embodiment, the master virtual smart card is stored in a password vault of each of the plurality of personal computers. For example, the master virtual smart card can include the personal identification number for the master virtual smart card.

In accordance with an embodiment, the method further comprising: converting, by the IAM client on the personal computer, a personal identification number of an administrator into the personal identification number for the master virtual smart card; and retrieving, by the IAM client on the personal computer, the stored personal identification number for the master virtual smart card during a logon of the first user of the plurality of users onto the personal computer. The personal computer can include a Windows NT operating system, and wherein the Windows NT operating system being Windows 10 with a trusted platform module. For example, the trusted platform module can be a version 1.2.

In accordance with an embodiment, the method further includes retrieving, with a Windows Custom Credential provider on the personal computer, the stored personal identification number for the master virtual smart card. In addition, the method can further include authenticating, on the personal computer, the first user of the plurality of users with a biometric protocol. For example, the method can include authenticating, on the personal computer, the first user of the plurality of users with a smart card.

In accordance with an embodiment, the method further includes disabling, by the identify and access management client on the personal computer, a user User Principle Name (UPN) in the Active Directory (AD) of an operating system of the personal computer; and injecting, by the identify and access management (IAM) client on the personal computer, a User Name for the first user of the plurality of users as the identity of the first user of the plurality of users. The method can also include sharing, by the identify and access management (IAM) client on the personal computer, a virtual private key and public keys to each of the plurality of users.

In accordance with an embodiment, the method can further include authenticating, on the personal computer, a second user of the plurality of users; injecting, by IAM client on the personal computer, an identity of the second t user of the plurality of users and the personal identification number of the virtual smart card into the Kerberos communication application programming interface (API) with the Active Directory (AD); and mapping, on the personal computer, the master virtual smart card to the second user of the plurality of users.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for mapping a virtual smart card to a plurality of users, the method comprising:
   hosting, on a personal computer, an identity and access management client, the identity and access management client configured to store a master virtual smart card for the plurality of users on the personal computer;
   authenticating, on the personal computer, a first user of the plurality of users;
   injecting, by the identity and access management client on the personal computer, an identity of the first user of the plurality of users and a personal identification number of the virtual smart card into a Kerberos communication application programming interface with an Active Directory, the Active Directory including the plurality of users;
   mapping, on the personal computer, the master virtual smart card to the first user of the plurality of users; and
   storing, in a password vault of the personal computer, the master virtual smart card, the master virtual smart card including the personal identification number for the master virtual smart card.

2. The method according to claim 1, wherein the Active Directory is an Active Directory Domain Services database, further comprising:
   receiving on the Active Directory Domain Services database, from an identify and access management server, an administrator configured public key infrastructure trust for the master virtual smart card for use by the first user of the plurality of users.

3. The method according to claim 1, further comprising:
   retrieving, with a Windows Custom Credential provider on the personal computer, the stored personal identification number for the master virtual smart card.

4. The method according to claim 1, further comprising:
   authenticating, on the personal computer, the first user of the plurality of users with a biometric protocol.

5. The method according to claim 1, further comprising:
   authenticating, on the personal computer, the first user of the plurality of users with a smart card.

6. The method according to claim 1, further comprising:
   disabling, by the identify and access management client on the personal computer, a user User Principle Name in the Active Directory of an operating system of the personal computer; and
   injecting, by the identify and access management client on the personal computer, a User Name for the first user of the plurality of users as the identity of the first user of the plurality of users.

7. The method according to claim 1, further comprising:
   sharing, by the identify and access management client on the personal computer, a virtual private key and public keys to each of the plurality of users.

8. The method according to claim 1, further comprising:
   authenticating, on the personal computer, a second user of the plurality of users;
   injecting, by identity and access management client on the personal computer, an identity of the second user of the plurality of users and the personal identification number of the virtual smart card into the Kerberos communication application programming interface with the Active Directory; and
   mapping, on the personal computer, the master virtual smart card to the second user of the plurality of users.

9. The method according to claim 1, wherein the personal computer comprises a plurality of personal computers, the method comprising:
   provisioning, to each of the plurality of personal computers, the master virtual smart card.

10. The method according to claim 9, further comprising:
    storing, in the password vault of each of the plurality of personal computers, the master virtual smart card.

11. The method according to claim 1, further comprising:
    converting, by the identity and access management client on the personal computer, a personal identification number of an administrator into the personal identification number for the master virtual smart card; and
    retrieving, by the identity and access management client on the personal computer, the stored personal identification number for the master virtual smart card during a logon of the first user of the plurality of users onto the personal computer.

12. The method according to claim 11, wherein the personal computer has a Windows NT operating system, the Windows NT operating system being Windows 10 with a trusted platform module.

13. The method according to claim 12, wherein the trusted platform module is version 1.2.

14. A non-transitory computer readable medium storing computer readable program code executed by a processor for mapping a virtual smart card to a plurality of users, the process comprising:
    hosting, on a personal computer, an identity and access management client, the identity and access management client configured to store a master virtual smart card for the plurality of users on the personal computer;
    authenticating, on the personal computer, a first user of the plurality of users;
    injecting, by the identity and access management client on the personal computer, an identity of the first user of the plurality of users and a personal identification number of the virtual smart card into a Kerberos communication application programming interface with an Active Directory, the Active Directory including the plurality of users;
    mapping, on the personal computer, the master virtual smart card to the first user of the plurality of users; and
    storing, in a password vault of the personal computer, the master virtual smart card, the master virtual smart card including the personal identification number for the master virtual smart card.

15. The non-transitory computer readable medium according to claim 14, wherein the Active Directory is an Active Directory Domain Services database, the process further comprising:

receiving on the Active Directory Domain Services database, from an identify and access management server, an administrator configured public key infrastructure trust for the master virtual smart card for use by the first user of the plurality of users.

16. The non-transitory computer readable medium according to claim 14, further comprising:

converting, by the identity and access management client on the personal computer, a personal identification number of an administrator into the personal identification number for the master virtual smart card; and retrieving, by the identity and access management client on the personal computer, the stored personal identification number for the master virtual smart card during a logon of the first user of the plurality of users onto the personal computer.

17. The non-transitory computer readable medium according to claim 14, further comprising:

authenticating, on the personal computer, a second user of the plurality of users;

injecting, by identity and access management client on the personal computer, an identity of the second user of the plurality of users and the personal identification number of the virtual smart card into the Kerberos communication application programming interface with the Active Directory; and mapping, on the personal computer, the master virtual smart card to the second user of the plurality of users.

18. The non-transitory computer readable medium according to claim 14, wherein the personal computer comprises a plurality of personal computers, the process further comprising:

provisioning, to each of the plurality of personal computers, the master virtual smart card.

19. The non-transitory computer readable medium according to claim 16, further comprising:

storing, in the password vault of each of the plurality of personal computers, the master virtual smart card.

20. A personal computer, comprising:

a memory having an Active Directory; and a processor configured to:

host an identity and access management client, the identity and access management client configured to store a master virtual smart card for a plurality of users on the personal computer;

authenticate a first user of the plurality of users;

inject by the identity and access management client an identity of the first user of the plurality of users and a personal identification number of the virtual smart card into a Kerberos communication application programming interface with the Active Directory, the Active Directory including the plurality of users;

map the master virtual smart card to the first user of the plurality of users; and store the master virtual smart card in a password vault of the personal computer, the master virtual smart card including the personal identification number for the master virtual smart card.

* * * * *